United States Patent
Khan et al.

(10) Patent No.: US 7,322,440 B2
(45) Date of Patent: Jan. 29, 2008

(54) ULTRALIGHT TRIM COMPOSITE

(75) Inventors: Hameed S. Khan, Crown Point, IN (US); James H. Fisher, North Manchester, IN (US); Steven D. Tessendorf, Schererville, IN (US); Peter Ehrler, Reinheim (DE)

(73) Assignee: Rieter Technologies AG, Winterthur (CH)

( * ) Notice: Subject to any disclaimer, the term of this patent is extended or adjusted under 35 U.S.C. 154(b) by 40 days.

(21) Appl. No.: 10/538,494

(22) PCT Filed: Dec. 8, 2003

(86) PCT No.: PCT/EP03/13870

§ 371 (c)(1),
(2), (4) Date: Jun. 9, 2005

(87) PCT Pub. No.: WO2004/053833

PCT Pub. Date: Jun. 24, 2004

(65) Prior Publication Data

US 2006/0113146 A1 Jun. 1, 2006

(30) Foreign Application Priority Data

Dec. 9, 2002 (EP) ................................ 02027437

(51) Int. Cl.
*E04B 1/82* (2006.01)
*E04B 2/02* (2006.01)

(52) U.S. Cl. ...................... 181/286; 181/289; 181/284; 181/285

(58) Field of Classification Search ................ 181/256, 181/284, 285, 291, 292, 293, 294
See application file for complete search history.

(56) References Cited

U.S. PATENT DOCUMENTS

| 4,130,175 A * | 12/1978 | Hehmann ................ 181/290 |
| 5,493,081 A * | 2/1996 | Manigold ................ 181/286 |
| 5,584,950 A * | 12/1996 | Gaffigan ................... 156/71 |
| 5,824,973 A * | 10/1998 | Haines et al. ............. 181/286 |
| 6,123,171 A * | 9/2000 | McNett et al. ............ 181/290 |
| 6,145,617 A * | 11/2000 | Alts ....................... 181/290 |
| 6,631,785 B2 * | 10/2003 | Khambete et al. ......... 181/290 |
| 2005/0016793 A1 * | 1/2005 | O'Regan et al. ........... 181/290 |

* cited by examiner

*Primary Examiner*—Lincoln Donovan
*Assistant Examiner*—Forrest Phillips
(74) *Attorney, Agent, or Firm*—The Nath Law Group; Jerald L. Meyer; Derek Richmond

(57) ABSTRACT

An ultra light, noise reducing composite (1) comprises an acoustically transparent, light weight film (6) between an underlay layer (5) and an air flow resistance layer (4). This composite allows to easily tune the acoustic properties by balancing the absorption and sound transmission behaviour of the composite (1). This air flow resistance layer (4) has an air flow resistance of between 500 Ns/m3 and 10,000 Ns/m3 and an area mass between 200 g/m2 and 3,000 g/m2. The underlay layer (5) has a stiffness value in the range between 100 Pa and 100,000 Pa. The light weight film (6) may consist of a synthetic foil and preferably has a thickness of 0.01 mm.

11 Claims, 2 Drawing Sheets

ULTRALIGHT TRIM COMPOSITE

Figure 1:
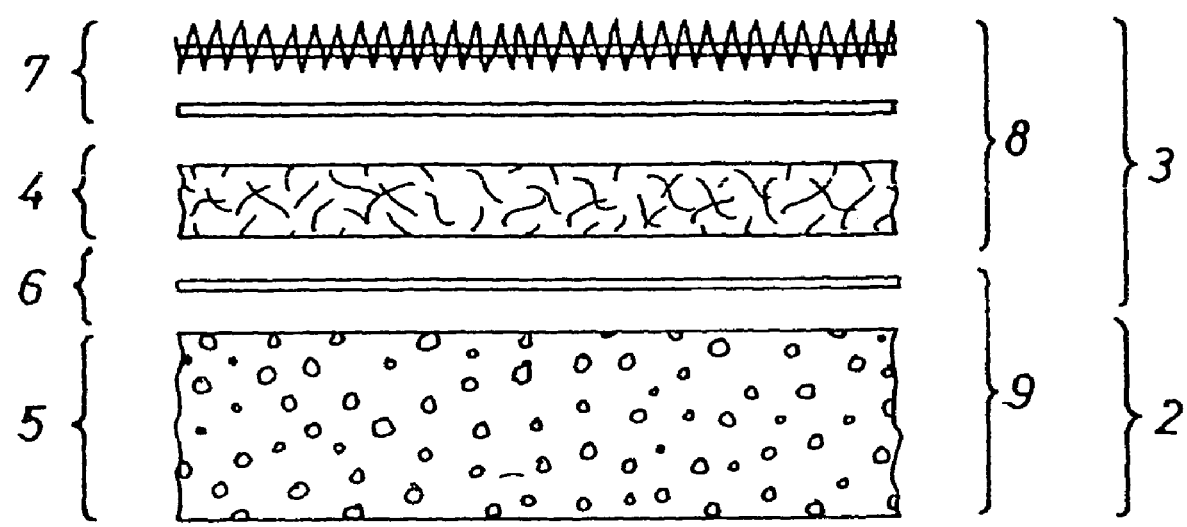

The present invention is concerned with an ultralight trim composite for reducing noise in motor vehicles and comprises the features of the preamble of claim 1.

Such a composite is disclosed in WO98/18656 and outlines a lightweight material configuration with material properties which provide a defined sound absorption behaviour. In particular, this absorption behaviour is controlled primarily by the area weight and air flow resistance properties of an open pored air flow resistance ("AFR") layer, as well by as the thickness of a porous backing or decoupler layer. The intention of this concept is to compensate for the reduction in transmission loss of the composite (caused by its reduced weight as compared to a conventional mass-barrier insulation system), with a well defined sound absorption behaviour.

The original industrialisation of this concept, where resonated fibre layers were used for both the AFR layer and the porous backing layer has proven to be successful. As development work continues to improve the success of this concept with other materials such as polyurethane foams, difficulties have been encountered in defining cost-effective processes to produce components which follow the guidelines of the above mentioned patent. Specifically, when backfoaming directly to a fibrous AFR layer, the foam chemicals saturate the fibres and effectively close pores of the AFR layer, resulting in poorly absorbing configurations with high air flow resistance values lying outside the target range of the teaching of the above publication.

Similar multilayer light weight products are already known in the art and disclosed in EP-B-0,384,420 for instance. The product according to this disclosure comprises an acoustically effective layer, which consists of a combination of two layers: at least one porous synthetic layer with an area mass from 150 g/m2 to 1500 g/m2 and one fleece layer with an area mass from approximately 50 g/m2 to 300 g/m2. This fleece layer is backfoamed or is covered with a dense foil and/or a heavy layer before backfoaming. This document is silent about the air flow resistance or the thickness of the acoustically effective layer, both parameters being relevant for optimising the acoustic behaviour of trim products.

All these known light weight products are rather difficult to manufacture and therefore cause high production costs when adapting these products to different purposes or applications which require slightly changed acoustic properties.

Therefore it is the aim of the present invention to achieve an ultralight trim composite with a structure which allows to easily tune the acoustic properties, i.e. has a high capacity for an inexpensive or low cost production of a large variety of products with a predetermined acoustic behaviour.

This is achieved by a composite according to claim 1 and in particular by balancing the absorption and sound transmission behaviour within a product comprising a first acoustically effective layer (AFR layer) having an air flow resistance R between 500 Ns/m3 and 10,000 Ns/m3, preferably between 500 Ns/m3 and 5,000 Ns/m3, in particular between 500 Ns/m3 and 2,500 Ns/m3 and having an area mass $m_A$ of between 200 g/m2 and 3,000 g/m2, in particular between 200 g/m2 and 1,600 g/m2. This AFR layer consists of a densified fibre felt and, in particular, comprises microfibres. Alternatively, this AFR layer may consist of perforated foils, foam, metallic foam or any other suitable materials. The sound absorption can easily be optimised by varying the thickness (0.5-8 mm, in particular 0.5-6 mm, preferably 2 mm) or the fibrous composition of this AFR layer. The multilayer product according to the present invention further comprises a second, foam underlay, layer with a very low compression force deflection (CFD) modulus, according to ISO, DIN or ASTM standards. The stiffness $S_D$ of this elastic second foam underlay layer acting as a decoupler has a typical value in the range of between 100 Pa and 100,000 Pa. This decoupler may be constituted from any suitable material, in particular a porous foam or a gel. In addition, the multilayer product according to the present invention comprises an acoustically transparent, very thin and light weight film arranged between the backing layer, i.e. the second foam underlay layer, and the first, sound absorbing AFR layer. This acoustically transparent film may consist of any thermoplastic material, in particular may consist of PVOH, PET, EVA, PE, PP foil or in particular of a PE/PA dual layer foil. This foil acts in combination with this backing layer as an acoustic foil absorber. In particular, this foil may consist of an adhesive layer or may consist of merely the skin of a foam slab. The above mentioned compression stiffness $S_D$ of the backing layer and the thickness of this film influence the acoustic behaviour of the product according to the present invention. It is to be understood that this film can be perforated, and in particular micro-perforated, in order to increase the absorption properties or can be unperforated in order to increase the transmission loss of the composite product. This backing layer can be constituted by a backfoaming process or by attaching a foam slab with a closed or open pored skin.

Preferred embodiments of the present invention comprise features of the dependent claims.

The advantages of the present invention are obvious to the man skilled in the art. Dependent upon the desired acoustic behaviour, it is easily and cost-effectively possible to assemble a corresponding product, by varying the AFR value of the first layer, by varying the amount and size of perforations in the film, and/or by varying the structure of the foam surface.

In addition this composite allows to easily separate the foam parts from the fibre felt parts during recycling.

In the following the viability of the present ultra light composite configuration, providing easily tunable sound absorption and transmission loss behaviour is discussed.

Figure 2:
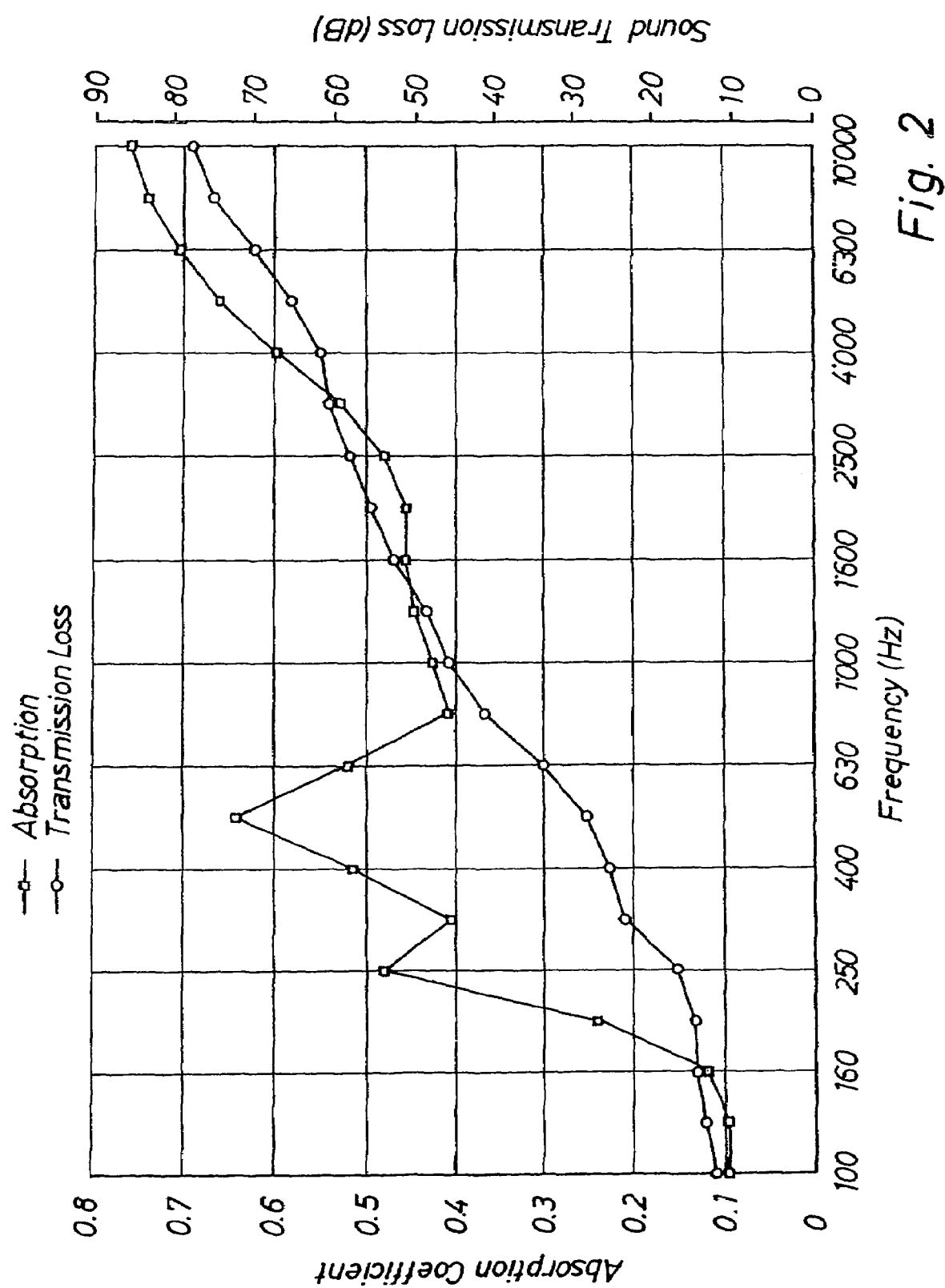

FIG. 1: shows a schematic view of a composite assembly according to the invention;

FIG. 2: shows a diagram representing an absorption and sound transmission loss behaviour of a typical composite according to the invention.

The ultralight trim composite 1 of the present invention comprises a combination of layers which primarily behave like an acoustic spring-mass-system, i.e. comprises at least one layer acting as a spring 2 and at least a sound absorbing AFR layer 4 acting as mass 3 of the acoustic spring-mass-system. This sound sound absorbing AFR layer 4 preferably consists of fibres or a combination of fibres and chipped foam.

The primary features of this composite are an acoustically transparent (acoustically invisible) thin film 6 present between a foam layer 5 and the AFR layer 4, which film prevents foam saturation in the fibres of the AFR layer. The soft foam backing layer 5 preferably has compression stiffness properties similar to those of the AFR layer 4. This composite may comprise further layers such as a decor or carpet layer 7, which are considered to be part of the air flow resistance absorption layer 8.

Due to the limitations of current process technology, direct foaming to a fibrous AFR layer 4 results in foam chemicals saturating the fibres of the AFR layer 4. This then closes the AFR layer 4, resulting in very high levels of airflow resistance and a corresponding degradation of the absorption performance of the composite.

To prevent saturation of the AFR layer fibres, an acoustically transparent, preferably non-porous, thin film 6 may be inserted between the AFR layer 4 and the foam 5 in the production process. One may clearly see that films 6 with thickness values of approximately 0.01 mm or less have negligible transmission loss behaviour, and are to be considered as acoustically transparent. Then when this type of film 6 is combined with an ultra light composite according to WO 98/18656, it allows a sufficient part of the incoming acoustic wave to pass through and be dissipated in the porous backing layer. The end result is a slight degradation of the absorption performance of the composite.

The normal incidence sound absorption behaviour of a 25 mm foam backing layer, and of a foam backing layer with 0.0125 mm film has been simulated and compared with impedance tube measurements. Then, the validated simulation models of the foam and film are used to define the properties of the film layer inserted between the AFR and foam backing layers, ensuring the best possible absorption behaviour for the composite.

The sound absorption of such a composite (with film) was simulated for film thickness values of 1 mm, 0.1 mm, 0.01 mm and 0.001 mm respectively. The case with 1 mm film offers generally poor absorption performance, while the results show that only small improvements may be achieved using films of less than 0.01 mm thickness.

The sound transmission behaviour of such a composite with varying film thickness values were measured. In the case of the 0.091 mm film, a slight reduction in transmission loss (TL) occurred in the low frequencies as compared to a non-film configuration, but beyond 300 Hz, an overall improvement of approx. 2-3 dB was observed. The reduction of TL in the lower frequencies is not a great cause of concern in automotive applications, since for these frequencies structure-borne noise is of more importance than airborne-noise, and the TL of the composite does not contribute significantly for this type of excitation.

To summarize, a critical dimension of the film is that the thickness should be approximately 0.01 mm to ensure a sufficient balance between absorption and sound transmission for such a composite. Any degradation in the absorption behaviour of such composite (with film) can be compensated for by a slight increase in sound transmission performance.

Along with specifying the thickness of the non-porous film, the compression stiffness of the foam backing 5 can also be defined to ensure that the present composite has similar sound transmission behaviour as known composites.

In particular, present lightweight configurations are more sensitive to the compression stiffness of the porous backing layer than conventional mass-based systems. This was shown when the simulated sound transmission loss of a known composite, along with configurations where the stiffness of the foam backing had been increased by factors of 5, 10 and 20. It can clearly be seen that increasing the stiffness of the backing layer shifts the sandwich resonance of the composite to higher frequencies. The risk then is that the sandwich resonance will coincide with localized panel vibrations in the vehicle, creating an effective noise radiator or transmitter.

Therefore, for systems with equivalent thickness and weight, the compression stiffness of the foam used in the foam backing according to the invention should be similar to the resonated felt backing in known assemblies in order to ensure that the present composite has a similar sound transmission behaviour.

This was shown by another measurement, where the Load—Force—Deflection (LFD) for 25 mm thickness samples of resonated felt and foam backing according to the invention have been measured. These curves express how the material stiffness changes with deformation. From this information, the material compression stiffness can be derived from the slope of the curve in the fully relaxed linear elastic region (less than 5% strain or deformation). The slopes are similar for both the foam and resonated felt layers, indicating that both materials have comparable compression stiffness values, i.e. have similar sound transmission loss performance.

The primary acoustic characteristic of the foam layer according to the invention is that it is soft in compression stiffness (the reason for its effectiveness as part of an ultralight composite), more so than typical polyurethane foams (PU), and comparable to so-called heavier viscoelastic foams.

Transmissivity (transmissibility) information (the ratio of motion at the top of the multilayer composite to the bottom of the composite) can be used to emphasize this statement further. The simulated transmissivity of a composite according to the invention, along with configurations where the stiffness of the foam backing has been decreased by a factor of 0.5, and increased by factors 5, 10 and 20 have been determined. In these measurements, the frequency of the sandwich resonance is clearly highlighted, along with other material resonances at occurring higher frequencies. As expected, for configurations with lightweight AFR layers, the use of a compressionally soft foam backing layer is effective at moving the sandwich resonance of the ultra light composite below the sensitive 400 Hz-1000 Hz frequency range. The performance of the composite then can be improved by reducing the stiffness of the backing layer even further, which can be achieved through the choice of foaming ingredients and processing methods.

Finally, a set of specifications for the range of allowable stiffness values of the foam backing according to the invention for given AFR layer weights, can be derived from the average transmissivity contour. Here, the transmissivity of UL composites with a 2 mm AFR layer, and 25 mm porous backing layer has been calculated and averaged over $3^{rd}$ octave frequency bands (10 Hz-2000 Hz) for varying AFR layer weights and backing layer compression stiffness values.

Using this information, the following general specifications for an ultra light composite may be given: AFR layer area weight greater than 0.2 kg/m$^2$, foam compression stiffness less than 50,000 Pa (currently used foams and a typical resonated felt pad have stiffness values of approx. 20,000 Pa).

As was described earlier, direct backfoaming to an AFR fibre layer seals the layer and causes a noticeable degradation in the absorption performance of the composite. By implementing a thin film between the AFR and foam layers, and by using a compressionally soft foam backing, the acoustic performance of a composite according to the invention can have the similar balance between absorption and sound transmission as conventional composites (spring-mass-systems having a heavy layer) with slightly reduced absorption and slightly improved sound transmission behaviour.

The acoustic behaviour of the present composite, as shown in FIG. 2, can easily be tuned, in particular by perforating the film 6 of the present composite 1, taking into consideration that the backing foam layer 5 and the film 6 may interact with each other in the manner of an acoustic foil absorber 9. Based on this concept it could be advantageous to use a perforated foil 6 and/or to use a foam slab 5 with or without an open pored skin. It is understood that the man skilled in the art can use a foam with open or closed cells. Investigations have shown that the absorption performance increases at lower frequencies when using foam slabs with increased skin weight. Using an open pored skin increases the absorption performance at higher frequency regions.

Of course, the composite according to the invention can be used not only in the automotive field but also in any technical fields where sound reducing panels are used, such as building constructions, in the machine industry, or in any transportion vehicles.

The invention claimed is:

1. An ultralight trim composite (1) comprising a first acoustically effective layer (4) and a second underlay layer (5), characterized in that for the balancing of the absorption and sound transmission behaviour of the composite, the first acoustically effective layer (4) has an air flow resistance R between 500 Ns/m³ and 10,000 Ns/m³ and has an area mass $m_A$ between 200 g/m² and 3,000 g/m2, the second underlay layer (5) has a very low compression force deflection modulus, i.e. a stiffness value $S_D$ in the range between 100 Pa and 100,000 Pa and in addition comprises an acoustically transparent, very thin and light weight film (6) between the second underlay layer (5) and the first acoustically effective layer (4), which film interacts with this underlay layer (5) in the manner of an acoustic foil absorber (9).

2. Composite according to claim 1, wherein the second underlay layer (5) is a backfoamed layer.

3. Composite according to claim 1, wherein the second foam underlay layer (5) consists of a foam slab.

4. Composite according to claim 3, wherein the foam slab comprises an open pored skin.

5. Composite according to claim 1, wherein the film (6) is perforated in order to increase the absorption properties.

6. Composite according to claim 5, wherein the film (6) is microperforated.

7. Composite according to claim 1, wherein the film (6) is unperforated in order to increase the transmission loss.

8. Composite according to claim 1, wherein the first acoustically effective layer (4) has a thickness of 0.5 mm to 8.0 mm.

9. Composite according to claim 8, wherein the first acoustically effective layer (4) has an area weight of about 1 kg/m².

10. Composite according to claim 1, wherein the second foam underlay layer (5) acting as a decoupler layer, has a thickness of about 20 mm.

11. Composite according to claim 1, wherein the film layer has a thickness of about 0.01 to 1.0 mm.

\* \* \* \* \*